United States Patent
Bseileh et al.

(10) Patent No.: US 10,296,000 B2
(45) Date of Patent: May 21, 2019

(54) UNMANNED VEHICLE INTERFACE DEVICE

(71) Applicant: DENSO International America, Inc., Southfield, MI (US)

(72) Inventors: Mouhamed Bseileh, Dearborn Hts., MI (US); Steven Sute, Dearborn, MI (US); William Boylan, Novi, MI (US); Tom Szawarski, Lake Orion, MI (US); Blaise Friery, Farmington Hills, MI (US); Matthew Buchanan, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 87 days.

(21) Appl. No.: 15/602,641

(22) Filed: May 23, 2017

(65) Prior Publication Data

US 2018/0341258 A1 Nov. 29, 2018

(51) Int. Cl.
| | |
|---|---|
| *G05D 1/00* | (2006.01) |
| *G05D 1/02* | (2006.01) |
| *B64C 39/02* | (2006.01) |
| *G01S 19/14* | (2010.01) |
| *G07C 9/00* | (2006.01) |
| *H04W 4/021* | (2018.01) |
| *H01Q 21/06* | (2006.01) |
| *G08C 17/02* | (2006.01) |

(52) U.S. Cl.
CPC ......... *G05D 1/0022* (2013.01); *B64C 39/024* (2013.01); *G01S 19/14* (2013.01); *G05D 1/0202* (2013.01); *G07C 9/00007* (2013.01); *G08C 17/02* (2013.01); *H01Q 21/062* (2013.01); *H04W 4/021* (2013.01); *B64C 2201/146* (2013.01); *G08C 2201/51* (2013.01); *G08C 2201/60* (2013.01); *G08C 2201/70* (2013.01); *G08C 2201/91* (2013.01)

(58) Field of Classification Search
CPC .... G05D 1/0022; G05D 1/0202; G08C 17/02; G08C 2201/91; H01Q 21/062; G07C 9/00007; G01S 19/14; H04W 4/021; B64C 2201/146; B64C 39/024
See application file for complete search history.

(56) References Cited

U.S. PATENT DOCUMENTS

2018/0120829 A1* 5/2018 Price .................... G05D 1/0022

FOREIGN PATENT DOCUMENTS

| JP | 2000152217 A | 5/2000 |
|---|---|---|
| JP | 2005204035 A | 7/2005 |

\* cited by examiner

*Primary Examiner* — Yuen H Wong (57) ABSTRACT

An unmanned vehicle interface device includes a wireless transceiver configured with a radiation pattern that covers a particular spatial region, and a controller coupled to the wireless transceiver. The controller is programmed to detect an unmanned vehicle within the particular spatial region using the wireless transceiver, upon detecting the unmanned vehicle, communicate with the unmanned vehicle using the wireless transceiver to override existing controls of the unmanned vehicle, and after overriding the existing controls, forcibly control the unmanned vehicle.

10 Claims, 7 Drawing Sheets

UNMANNED VEHICLE INTERFACE DEVICE

TECHNICAL FIELD

The present disclosure relates to an interface device for detecting and controlling unmanned vehicles.

BACKGROUND

The use of unmanned vehicles has become widespread in recent years. For example, unmanned aerial vehicles ("UAVs"), also known as "drones", have become commercially available to individual users in numerous models and sizes. However, there is a concern that these unmanned vehicles may inadvertently intrude upon prohibited space. For instance, a drone may inadvertently fly into a protected air zone. In this regard, it may be desirable for a third party to detect and control any unmanned vehicles which enter into the prohibited space, preferably in a non-destructive manner.

SUMMARY

According to one aspect of the present disclosure, an unmanned vehicle interface device includes a wireless transceiver configured with a radiation pattern that covers a particular spatial region, and a controller coupled to the wireless transceiver. The controller is programmed to detect an unmanned vehicle within the particular spatial region using the wireless transceiver, upon detecting the unmanned vehicle, communicate with the unmanned vehicle using the wireless transceiver to override existing controls of the unmanned vehicle, and after overriding the existing controls, forcibly control the unmanned vehicle.

Still other objects, advantages, and features of the present disclosure will become apparent after considering the detailed description and drawings.

DETAILED DESCRIPTION

First Embodiment

A first embodiment of the present disclosure will be explained with reference to FIGS. 1 to 4.

Figure 1:
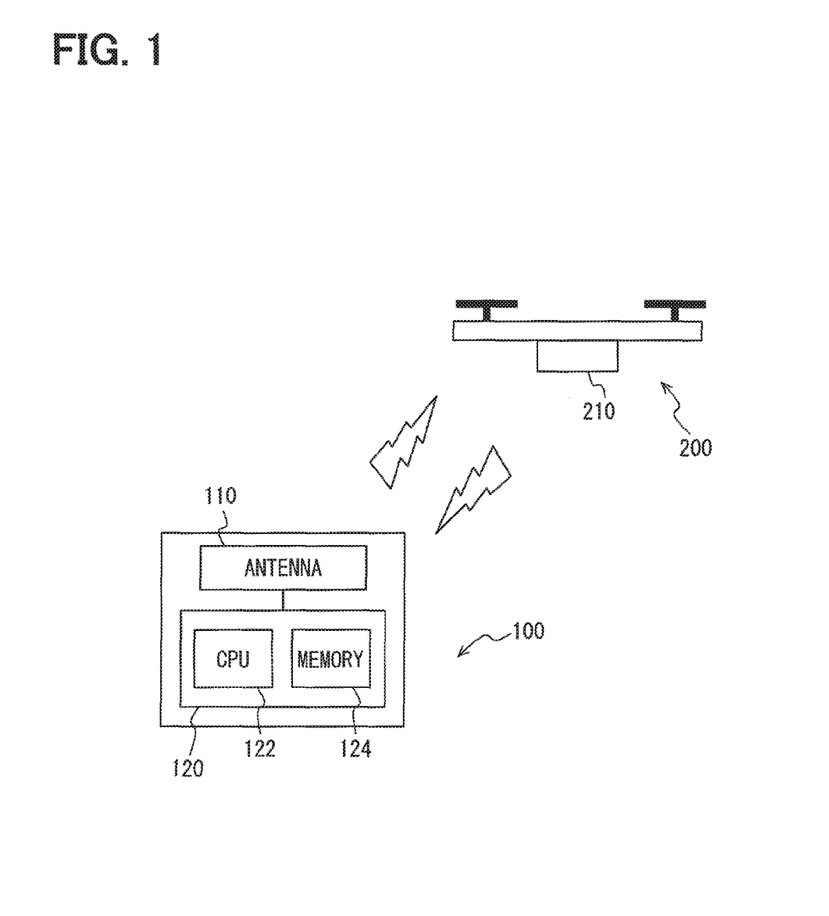
FIG. 1 is a system view of an unmanned vehicle interface device and an unmanned vehicle.

FIG. 1 is a schematic view of an unmanned vehicle interface device 100 (also simply referred to as "interface device") according to the present embodiment. As illustrated, the interface device 100 includes an antenna 110 and a controller 120.

The antenna 110 is an electromagnetic wireless transceiver that converts electric signals into radio signals, and converts radio signals into electric signals. As will be described in detail later, the antenna 110 is configured with a particular radiation pattern. The antenna 110 is coupled to the controller 120 and is in communication with the controller 120. More specifically, the antenna 110 is configured to receive electric signals from the controller 120 and converts these electric signals into radio signals. Further, the antenna 110 receives radio signals and converts these radio signals into electric signals, which are output to the controller 120. In alternative embodiments, the antenna 110 may be provided as two separate antenna units used for receiving and transmitting signals, respectively, rather than as a single transceiver unit.

The controller 120 includes a central processing unit (CPU) 122 and a memory 124. The CPU 122 is preferably a microcomputer or microprocessor. The memory 124 is preferably a semiconductor memory such as random access memory (RAM), read only memory (ROM), flash memory, or a combination of these. The memory 124 has stored thereon instructions which program the CPU 122 to perform a variety of tasks as will be described later. In an alternative embodiment, the controller 120 may be implemented as a remote processor, such as through the use of a remote cloud computing server which communicates with the interface device 100 via wired or wireless communication. In other words, a portion or all of the processing tasks of the controller 120 may be performed remotely.

As shown in FIG. 1, the interface device 100 is configured to be able to communicate with an unmanned vehicle 200 operated by a third party owner. In this figure, the unmanned vehicle 200 is illustrated as a typical quad rotor helicopter drone, but this example is not intended to be limiting. The unmanned vehicle 200 may be a helicopter with any number of rotors, or may be a fixed-wing aircraft. The unmanned vehicle 200 may also be a ground vehicle. In this regard, in the present embodiment, the interface device 100 is configured to be able to interface with a wide variety of unmanned vehicles. The interface device 100 may also interface with a plurality of unmanned vehicles simultaneously, providing that a plurality of unmanned vehicles are within communication range. The following discussion focuses on only the unmanned vehicle 200 as an illustrative example for ease of understanding.

In the present embodiment, the unmanned vehicle 200 includes a communication module 210 that enables communication with the interface device 100. For example, the communication module 210 may include an antenna (not illustrated) which acts as a radio transceiver corresponding to the antenna 110 of the interface device 100. The communication module 210 may also include components for additional communication protocols commonly found in commercial drones. In addition, the unmanned vehicle 200 may include a variety of sensors (not illustrated) for navigation purposes. For example, the unmanned vehicle 200 may include any of a GPS sensor, an ultrasound sensor, or an optical sensor, i.e., a camera. These sensors are also commonly provided in typical commercial drones and therefore detailed descriptions of these sensors are omitted for brevity.

It should be noted that the unmanned vehicle 200 may be directly controlled by a third party owner (e.g., through a smartphone or other user interface), or may be navigating autonomously (e.g., travelling on a pre-programmed route). In other words, in the present embodiment, the unmanned vehicle 200 is normally controlled by a source other than the interface device 100.

Figure 2A:
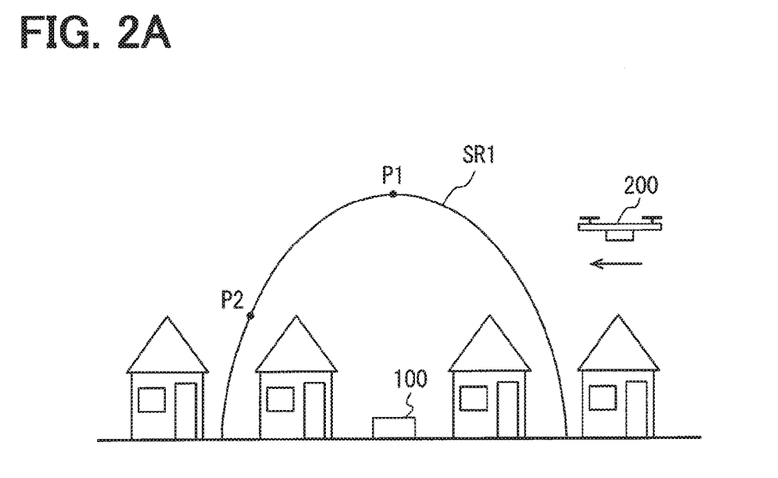
FIG. 2A is a schematic view of an unmanned vehicle interface device and an unmanned vehicle with respect to a spatial region.
Figure 2B:
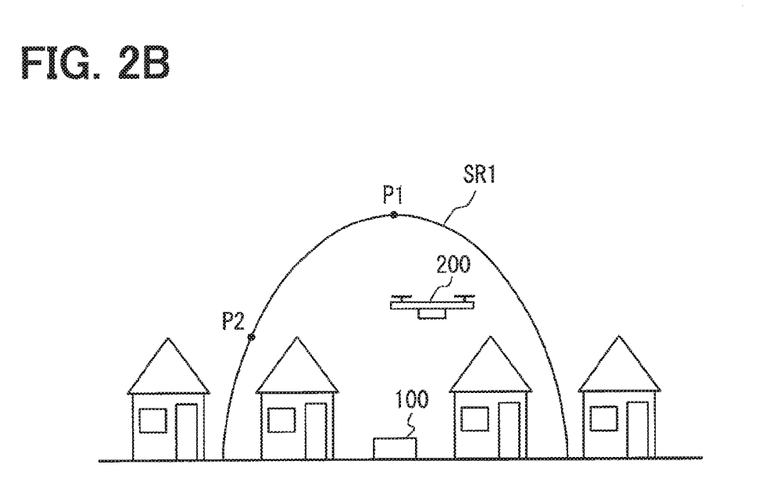
FIG. 2B is a schematic view of an unmanned vehicle interface device and an unmanned vehicle with respect to a spatial region.

Next, a zone control aspect of the interface device 100 will be described with respect to FIGS. 2A and 2B. Here, FIGS. 2A and 2B are front views of an exemplary implementation of the interface device 100. As described previous, the antenna 110 of the interface device 100 is configured with a particular radiation pattern. In FIGS. 2A and 2B, the radiation pattern of the antenna 110 covers a spatial region SR1, which corresponds to a prohibited space to be protected by the interface device 100.

The term "radiation pattern" is used with its typical meaning, i.e., representing the directional dependence of the signal strength to and from an antenna (i.e., directivity). In contrast, a "spatial region" used herein means a defined region of space. In the present embodiment, the spatial region SR1 has the same shape as the radiation pattern of the antenna 110. In other words, the shape of the spatial region SR1 is defined by the radiation pattern of the antenna 110. In FIGS. 2A and 2B, the spatial region SR1 is depicted as a roughly spherical shape (terminating at the ground plane for simplicity), and so the radiation pattern of the antenna 110 in this example is also a roughly spherical, or omnidirectional, pattern.

In the present embodiment, the interface device 100 monitors the spatial region SR1 for any unmanned vehicles, such as the illustrated unmanned vehicle 200. In FIG. 2A, the unmanned vehicle 200 is outside of the spatial region SR1, and traveling toward the spatial region SR1. Then, in FIG. 2B, the unmanned vehicle 200 has entered into the spatial region SR1. The interface device 100 is configured to detect the presence of the unmanned vehicle 200 in the spatial region SR1 through a combination of a frequency and a signal strength of the unmanned vehicle 200.

First regarding signal strength, as mentioned previously, the shape of the spatial region SR1 is defined by the radiation pattern of the antenna 110. In other words, the radiation pattern of the antenna 110 has the same shape as the spatial region SR1. As a result, the relative signal strength of the unmanned vehicle 200 with respect to the antenna 110 is the same whether the unmanned vehicle is at point P1 or point P2 shown in FIGS. 2A and 2B.

Further, in FIGS. 2A and 2B, the antenna 110 is assumed to be substantially omnidirectional, such that signal strength of the antenna 110 attenuates at a similar rate in all directions. As a result, regardless of the relative direction between the interface device 100 and the unmanned vehicle 200, the signal strength of a signal from the unmanned vehicle 200 as received by the interface device 100 depends only on the distance between the interface device 100 and the unmanned vehicle 200. As a result, by setting an appropriate signal strength threshold that corresponds to the boundary of the spatial region SR1, the interface device 100 is able to determine whether the unmanned vehicle 200 is within the spatial region SR1. This signal strength threshold is preferably determined through routine prior simulation or prior experimentation.

The radiation pattern of the antenna 110 is not limited to the example shown in FIGS. 2A and 2B. The present embodiment contemplates a variety of modifications to the radiation pattern of the antenna 110 to obtain a desired shape for the spatial region SR1.

Figure 3A:
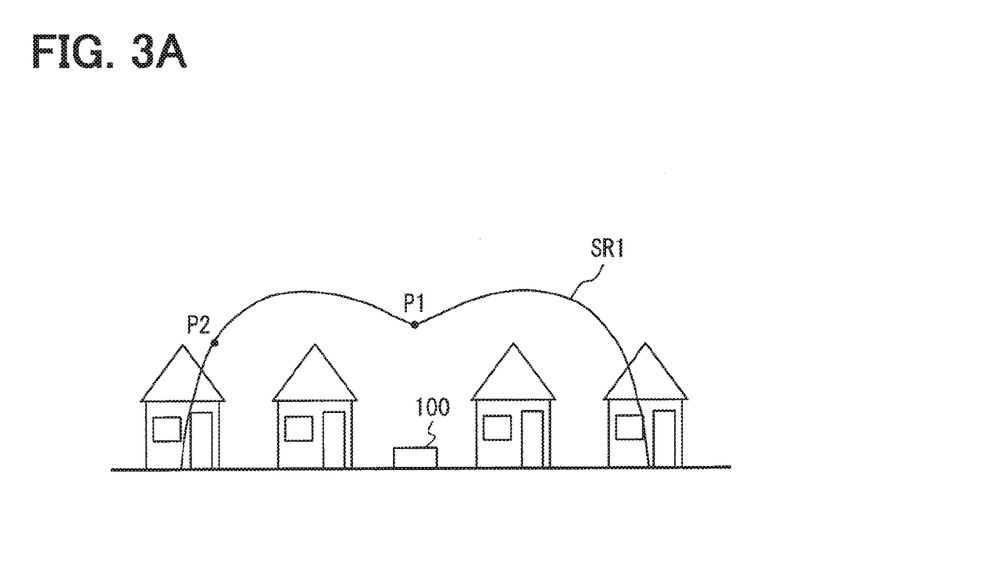
FIG. 3A is a schematic view of an unmanned vehicle interface device and an unmanned vehicle with respect to a spatial region.

For example, as shown in FIG. 3A, the antenna 110 may be configured as a typical dipole antenna which has a roughly toroid shaped radiation pattern, i.e., approximately omnidirectional in horizontal directions but relatively weak in the vertical direction. As a result, the shape of the spatial region SR1 is also a roughly toroid shape, as illustrated. In this example as well, the signal strength of the unmanned vehicle 200 with respect to the antenna 110 is the same along the entire border of the spatial region SR1. In other words, the relative signal strength of the unmanned vehicle 200 with respect to the antenna 110 is the same whether the unmanned vehicle is at point P1 or point P2 shown in FIG. 3A. As a result, the unmanned vehicle 200 is allowed to approach closer to the interface device 100 from the vertical direction than a horizontal direction.

Figure 3B:
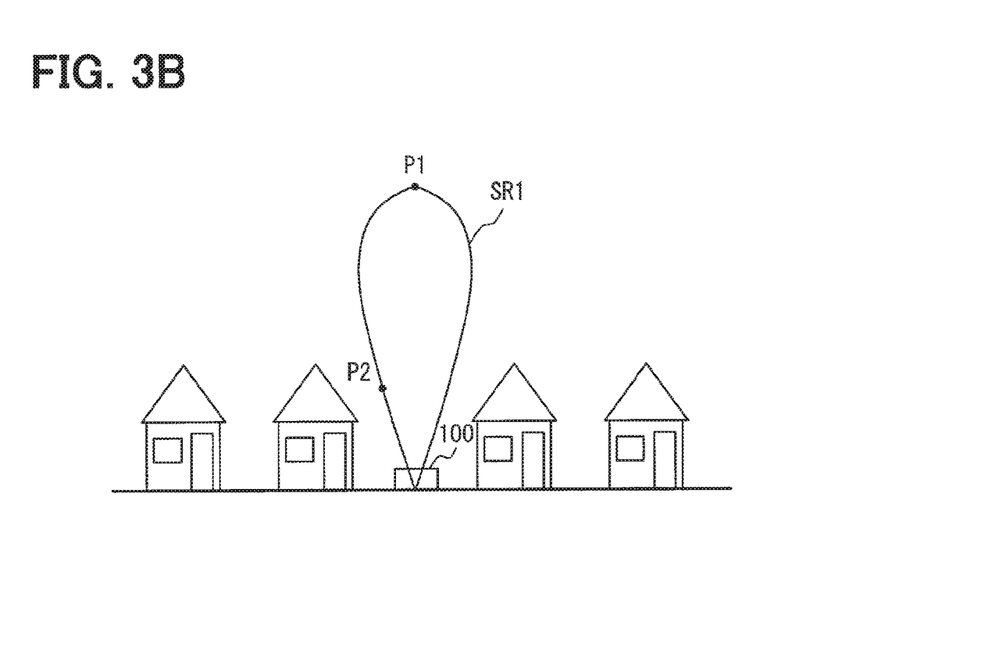
FIG. 3B is a schematic view of an unmanned vehicle interface device and an unmanned vehicle with respect to a spatial region.

As another example shown in FIG. 3B, the antenna 110 may be configured as a typical Yagi antenna which has a highly directional radiation pattern. In this example, the antenna 110 is oriented such that the greatest signal strength is directed upward, and so the shape of the spatial region SR1 is also directed upward. In this example as well, the signal strength of the unmanned vehicle 200 with respect to the antenna 110 is the same along the entire border of the spatial region SR1. In other words, the relative signal strength of the unmanned vehicle 200 with respect to the antenna 110 is the same whether the unmanned vehicle is at point P1 or point P2 shown in FIG. 3B. As a result, the unmanned vehicle 200 is allowed to approach closer to the interface device 100 from a horizontal direction than the vertical direction.

The examples of FIGS. 2A, 2B, 3A, and 3B are not intended to be limiting. The radiation patterns in these figures are depicted as ending at ground level, but may in actuality continue past the ground plane, and this point is disregarded for simplicity in the present disclosure. The antenna 110 may be configured with a wide variety of radiation patterns, depending on the desired shape of the spatial region SR1, e.g., by combining multiple types of antennas. For example, the antenna 110 may be a compound antenna formed of at least a dipole antenna and a Yagi antenna. The radiation pattern of the antenna 110 may be further shaped as appropriate by implementing directional shielding, as known in the field of antenna design.

Next, regarding frequency, in the present embodiment, the interface device 100 is configured to identify the unmanned vehicle 200 based on the frequency of a signal broadcasted by the unmanned vehicle 200. In particular, the interface device 100 is configured to communicate with the unmanned vehicle 200 in a prescribed frequency range. For example, 2.4 GHz and 5.8 GHz are common frequencies for wireless (radio) communications. The interface device 100 may be configured to communicate at a plurality of different frequencies (or frequency bands) in order to be able to interface with a wide variety of unmanned vehicles.

In the present embodiment, the interface device 100 may operate in a passive mode to wait for identification signals from the unmanned vehicle 200, the identification signals being transmitted in the prescribed frequency range and indicating the identity of the unmanned vehicle 200. Alternatively, the interface device 100 may operate in an active mode in which the interface device 100 transmits identification request signals at regular intervals. When the unmanned vehicle 200 receives such an identification request signal, then unmanned vehicle 200 then transmits an identification signal to the interface device 100. The specific protocol and structure of these signals are predetermined based on, e.g., manufacturer specifications, and thus such details are omitted from description for brevity. Moreover, these operation states are exemplary in nature and not intended to be limiting. The interface device 100 may operate in a variety of modes or combinations of modes to interface with a wide variety of unmanned vehicles.

Figure 4:
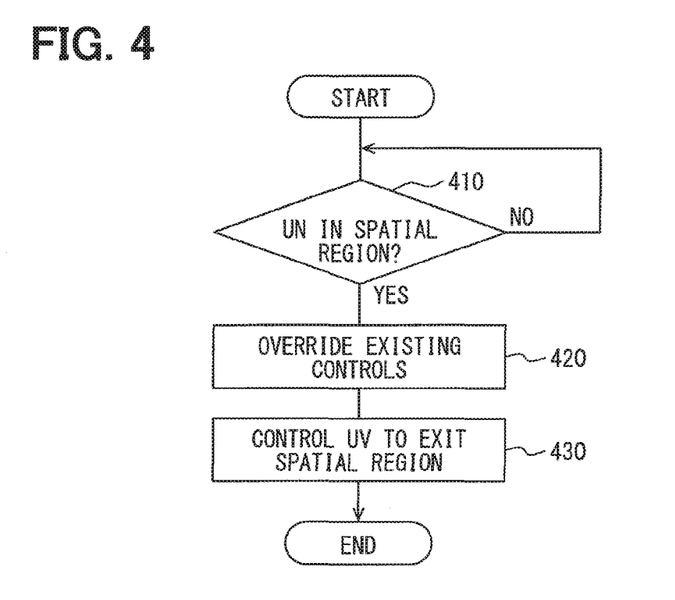
FIG. 4 is a flow chart showing a zone control process.

FIG. 4 illustrates an exemplary zone control process performed by the controller 120 in the present embodiment.

At step 410, the controller 120 determines whether the unmanned vehicle 200 is within the spatial region SR1. As described above, this is possible by designing the antenna 110 with an appropriate radiation pattern, and then detecting whether a signal strength from the unmanned vehicle 200 is above a signal strength threshold corresponding to the spatial region SR1. If the controller 120 determines that the unmanned vehicle 200 is not within the spatial region SR1 ("NO" at step 410), the process returns to step 410 to repeat step 410.

If the controller 120 determines that the unmanned vehicle 200 is within the spatial region SR1 ("YES" at step 410), the controller 120 then proceeds to step 420. At step 420, the controller 120 performs an override process which overrides the existing controls of the unmanned vehicle 200. As described previously, the unmanned vehicle 200 is normally controlled by a source other than the interface device 100 (e.g., direct control by a third party, or autonomous navigation). At step 420, however, the controller 120 overrides this control source to assume direct control of the unmanned vehicle 200.

Specifically, in the present embodiment, the controller 120 is configured to use the antenna 110 to send a predetermined control override message to the unmanned vehicle 200. This predetermined control override message may be determined, e.g., by the manufacturer of the unmanned vehicle 200 and therefore be specific to the type or model of the unmanned vehicle 200. Accordingly, a plurality of types of control override messages are preferably stored in the memory 124 to allow the interface device 100 to interface with a wide variety of unmanned vehicles. It is contemplated that the override process involves a plurality of messages back and forth between the interface device 100 and the unmanned vehicle 200, e.g., various handshakes, confirmations, etc., and the specific details of this process may be designed as appropriate at a manufacturer level.

Upon gaining control of the unmanned vehicle 200, the controller 120 proceeds to step 430. At step 430, the controller 120 forcibly controls the unmanned vehicle 200, e.g., to move toward a particular location. It should be noted that the term "forcibly control" used in this context refers to the interface device 100 overriding the existing controls of the unmanned vehicle 200 so as to control the unmanned vehicle 200 to travel in a manner different than as prescribed by these existing controls.

In the present embodiment, the controller 120 preferably controls the unmanned vehicle 200 to exit the spatial region SR1. Here, a variety of control methods may be used, depending on the desired application. For instance, the controller 120 may simply send a designated physical location outside of the spatial region SR1 to the unmanned vehicle 200, and direct the unmanned vehicle 200 to proceed to this physical location. If the unmanned vehicle 200 is an aerial vehicle such as a drone, the controller 120 may direct the unmanned vehicle 200 to land and stop at the physical location.

If the protected spatial region SR1 is a particularly sensitive area (e.g., there is existing aerial traffic within the spatial region SR1, so the unmanned vehicle 200 would represent a significant safety risk), the controller 120 preferably controls the unmanned vehicle 200 to immediately exit the spatial region SR1 or immediately stop (and land if applicable). Alternatively, if the protected spatial region SR1 is not a particularly sensitive area (e.g., simply no aerial photography permitted), the controller 120 may control the unmanned vehicle 200 to travel across the spatial region SR1 and exit the spatial region SR1 toward the original intended destination of the unmanned vehicle 200. Further alternatively, the controller 120 may simply control the unmanned vehicle 200 to return to its operator. Accordingly, the present embodiment contemplates a wide variety of methods of removing the unmanned vehicle 200 from the spatial region SR1 or otherwise forcibly control the unmanned vehicle 200, and these examples are not intended to be limiting.

During this control process, the controller 120 may interface directly with the control and sensor systems of the unmanned vehicle 200. For instance, the controller 120 may use GPS sensors or ultrasound sensors provided in the unmanned vehicle 200 to safely guide the unmanned vehicle 200 to the designated physical location. Alternatively, the controller 120 may rely on autonomous navigation capabilities of the unmanned vehicle 200, i.e., by simply sending the designated physical location to the unmanned vehicle 200 and allowing the unmanned vehicle 200 to autonomously travel to the designated physical location. The physical location may be described as, for example, a set of GPS coordinates.

The present embodiment contemplates a wide variety of control methods at step 430, and the above examples are not intended to be limiting. Regardless of how the unmanned vehicle 200 is controlled to exit the spatial region SR1, as a result of the above zone control process, the interface device 100 is able to protect the spatial region SR1 from intruding unmanned vehicles without causing damage to the intruding unmanned vehicles.

For example, in a comparative example, a drone warding device may ward against intruding drones by physically damaging any intruding drones with, e.g., lasers. In contrast, according to the present embodiment, the interface device 100 is configured to perform a control override on any intruding unmanned vehicles to safely guide the intruding unmanned vehicles to a safe location.

Second Embodiment

A second embodiment of the present disclosure will be described with reference to FIG. 5. Elements which are substantially similar to, or otherwise correspond with, those of the previous embodiment will be denoted with the same reference numerals, and descriptions thereof are omitted for brevity.

In the first embodiment, the interface device 100 is configured to detect whether the unmanned vehicle 200 is within the spatial region SR1 by setting a signal strength threshold which corresponds to the shape of the spatial region SR1. In contrast, in the present embodiment, the interface device 100 is configured with a highly directional antenna 110 to simplify the detection process.

As previously explained with reference to the exemplary radiation pattern of FIG. 3B, the antenna 110 may be configured with a highly directional radiation pattern so as to, for example, be mostly directed upward. In this example, the unmanned vehicle 200 will only be detectable by the interface device 100 when the unmanned vehicle 200 is substantially above the interface device 100. As a result, when using a highly directional antenna 110, the interface device 100 may simplify the detection of the unmanned vehicle 200 as shown in the zone control process of FIG. 5.

Figure 5:
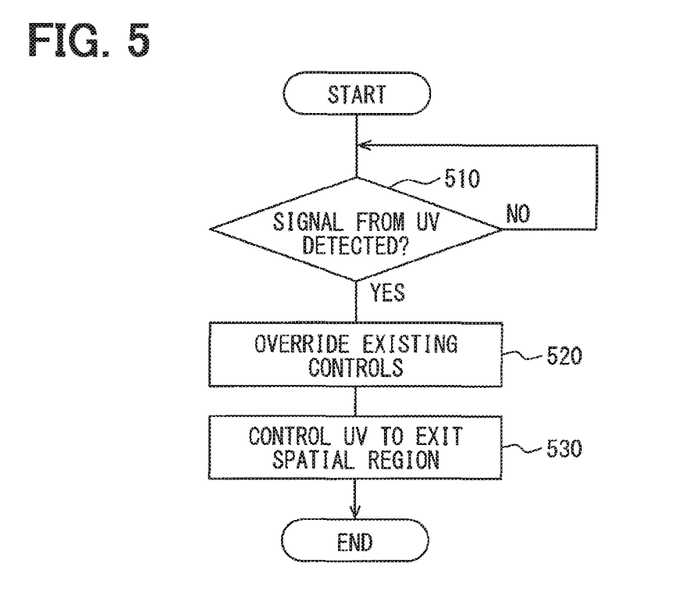
FIG. 5 is a flow chart showing a zone control process.

In FIG. 5, at step 510, the controller 120 simply determines whether a signal from the unmanned vehicle 200 is detected or not. If the controller 120 does not detect a signal from the unmanned vehicle 200 ("NO" at step 510), the process returns to step 510 to repeat step 510. Conversely, if the controller 120 detects a signal from the unmanned vehicle 200 ("YES" at step 510), the controller 120 then proceeds to steps 520 and 530, which are equivalent to steps 420 and 430 of the previous embodiment.

In other words, in the zone control process of FIG. 5, the interface device 100 effectively treats the detection of a signal (i.e., any signal) from the unmanned vehicle 200 as equal to determining that the unmanned vehicle 200 is within the spatial region SR1. In addition, in the present embodiment, the effective range of the antenna 110 (i.e., the detection range of the interface device 100) may be designed to correspond closely to the desired spatial region SR1 by further shaping the directivity of the antenna 110 (e.g., by adding directional shielding), regulating the gain of the antenna 110, etc.

Third Embodiment

A third embodiment of the present disclosure will be described with reference to FIGS. 6 to 7. Elements which are substantially similar to, or otherwise correspond with, those of the previous embodiments will be denoted with the same reference numerals, and descriptions thereof are omitted for brevity.

Figure 6A:
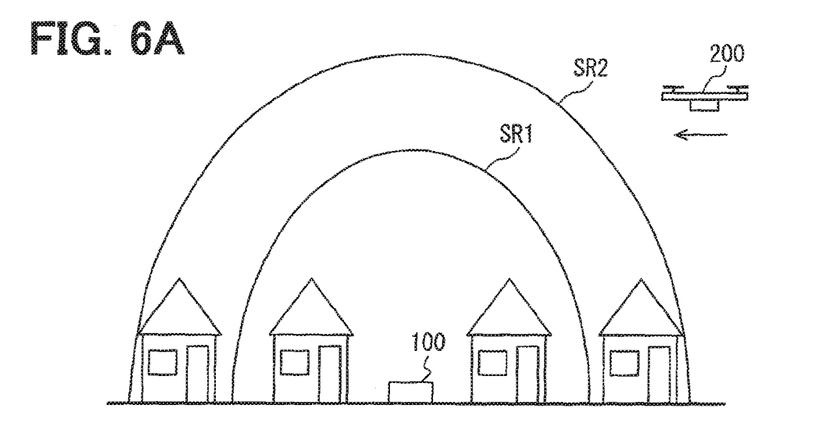
FIG. 6A is a schematic view of an unmanned vehicle interface device and an unmanned vehicle with respect to an inner spatial region and an outer spatial region.
Figure 6B:
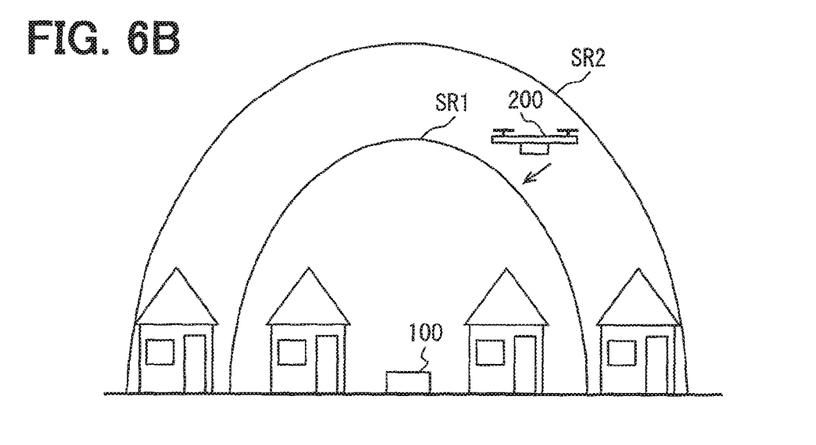
FIG. 6B is a schematic view of an unmanned vehicle interface device and an unmanned vehicle with respect to an inner spatial region and an outer spatial region.
Figure 6C:
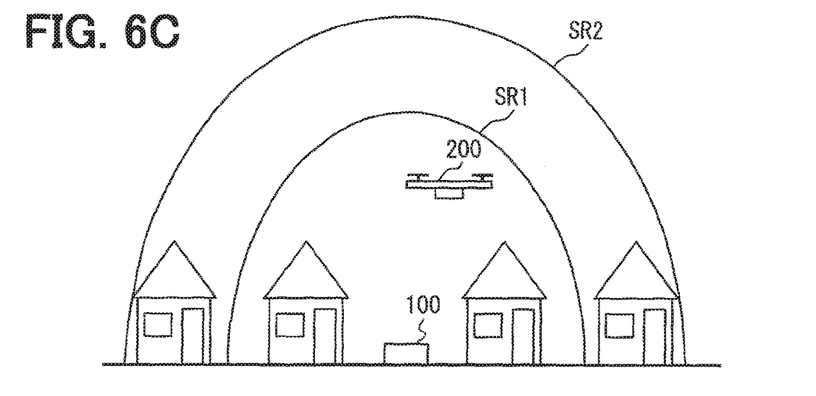
FIG. 6C is a schematic view of an unmanned vehicle interface device and an unmanned vehicle with respect to an inner spatial region and an outer spatial region.

As shown in FIGS. 6A to 6C, in the present embodiment, the radiation pattern of the antenna 110 covers the spatial region SR1, and also covers a spatial region SR2 which is larger than the spatial region SR1 so as to surrounding the spatial region SR1. For convenience, in the present embodiment, the spatial region SR1 is referred to as an inner spatial region SR1, while the spatial region SR2 is referred to as an outer spatial region SR2.

In the present embodiment, the inner spatial region SR1 corresponds to a prohibited space as in the previous embodiment. The outer spatial region SR2, meanwhile, corresponds to a warning space. As in the previous embodiments, the shapes of the spatial regions SR1, SR2 correspond with the radiation pattern of the antenna 110.

In the present embodiment, both the inner spatial region SR1 and the outer spatial region SR2 are defined by the same physical antenna unit of the antenna 110. This physical antenna unit may be configured as a combination of several antenna types as described previously, but is used to define both the inner spatial region SR1 and the outer spatial region SR2. In this case, the size difference between the inner spatial region SR1 and the outer spatial region SR2 as illustrated in FIGS. 6A to 6C is configured by designating the spatial regions SR1, SR2 with different signal strength thresholds.

As described previously, it is well known in antenna theory that signal strength attenuates with distance. Accordingly, for instance, assuming that the inner spatial region SR1 is designated with an arbitrary received signal strength indicator (RSSI) of 50%, the outer spatial region SR2 may be designated with an RSSI of 25%. In this example, the unmanned vehicle 200 may be detected as being within the outer spatial region SR2 (and outside of the inner spatial region SR1) when the signal strength from the unmanned vehicle 200 has an RSSI between 25% and 50%. Further, in this example, the unmanned vehicle 200 may be detected as being within both the inner and outer spatial regions SR1, SR2 when the signal strength from the unmanned vehicle 200 has an RSSI of at least 50%. These arbitrary RSSI values may be designed as appropriate to select the desired sizes of the spatial regions SR1, SR2.

Figure 7:
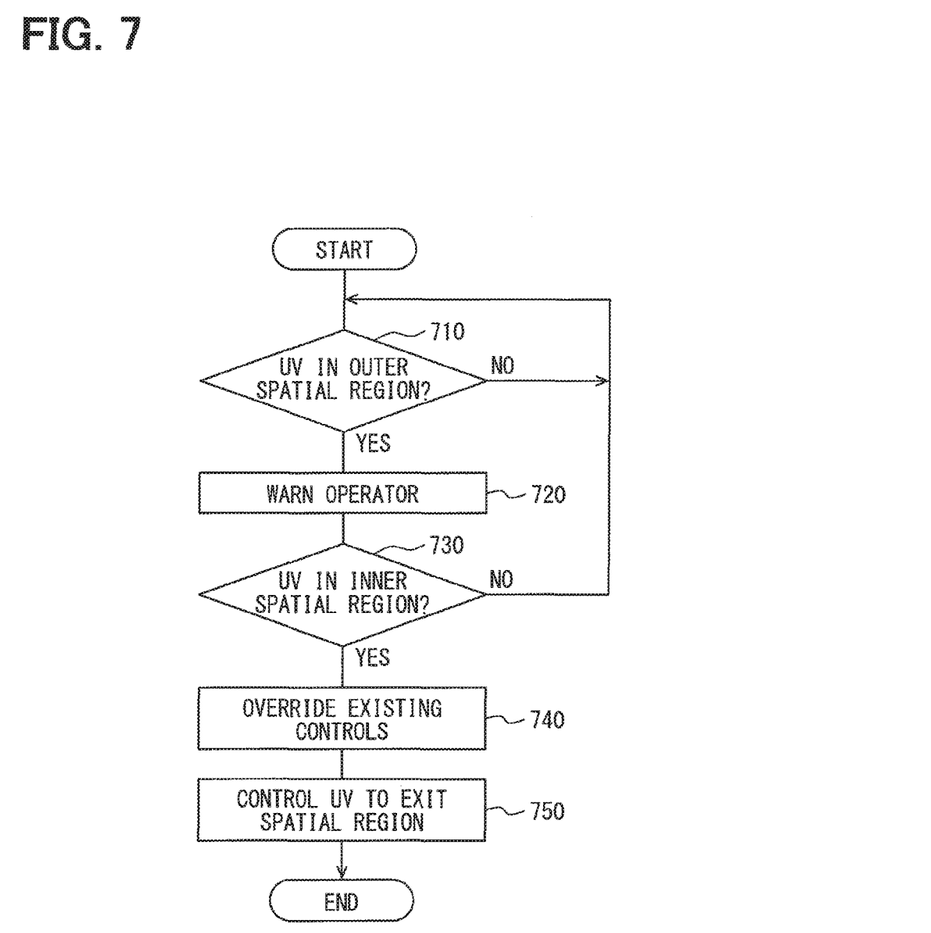
FIG. 7 is a flow chart showing a zone control process.

FIG. 7 illustrates an exemplary zone control process performed by the controller 120 in the present embodiment.

At step 710, the controller 120 determines whether the unmanned vehicle 200 is within the outer spatial region SR2. As described above, this is possible by designing the antenna 110 with an appropriate radiation pattern, and then detecting whether a signal strength from the unmanned vehicle 200 is above a signal strength threshold (such as a specific RSSI value) corresponding to the outer spatial region SR2. If the controller 120 determines that the unmanned vehicle 200 is not within the outer spatial region SR2 ("NO" at step 710), the process returns to step 710 to repeat step 710.

If the controller 120 determines that the unmanned vehicle 200 is within the outer spatial region SR2 ("YES" at step 710), the controller 120 then proceeds to step 720. At step 720, the controller 120 sends a warning to an operator of the unmanned vehicle 200. As described previously, the unmanned vehicle 200 is normally controlled by a source other than the interface device 100. Here, the operator of the unmanned vehicle 200 corresponds to the control source of the unmanned vehicle 200, i.e., a third party controlling or monitoring the unmanned vehicle 200.

In the present embodiment, at step 720, the controller 120 communicates with the unmanned vehicle 200 to issue a warning to the operator of the unmanned vehicle 200. The specific details of this warning process will depend on the specific type or model of the unmanned vehicle 200, and is contemplated as being determined on a manufacturer level.

It should be noted that a wide variety of warnings are contemplated and the present embodiment is not intended to be limited to any specific type of warning. For example, the controller 120 may send a message to the unmanned vehicle 200 which is then relayed to a smartphone carried by the operator of the unmanned vehicle 200. As another example, the warning message may include geographical data indicating the location of the inner spatial region SR1 so that the operator of the unmanned vehicle 200 may ensure that the unmanned vehicle 200 does not travel into the inner spatial region SR1. Further, it is contemplated that in some cases the unmanned vehicle 200 may not be equipped with capabilities for relaying a warning message, and in those cases step 720 may be simply skipped.

After step 720, the controller 120 continues to step 730, at which the controller 120 determines whether the unmanned vehicle 200 is within the inner spatial region SR1. As described above, this is possible by designing the antenna 110 with an appropriate radiation pattern, and then detecting whether a signal strength from the unmanned vehicle 200 is above a signal strength threshold (such as a specific RSSI value) corresponding to the inner spatial region SR1. If the controller 120 determines that the unmanned vehicle 200 is not within the inner spatial region SR1 ("NO" at step 730), the process returns to step 710.

If the controller 120 determines that the unmanned vehicle 200 is within the inner spatial region SR1 ("YES" at step 730), the controller 120 then proceeds to step 740. At step 740, similar to the first embodiment, the controller 120 is configured to use the antenna 110 to send a predetermined control override message to the unmanned vehicle 200.

Upon gaining control of the unmanned vehicle 200, the controller 120 proceeds to step 750. At step 750, again similar to the first embodiment, the controller 120 controls the unmanned vehicle 200 to exit the inner spatial region SR1. Alternatively, the controller 120 may control the unmanned vehicle 200 to exit the outer spatial region SR2 as well.

Fourth Embodiment

A fourth embodiment of the present disclosure will be described with reference to FIG. 8. Elements which are substantially similar to, or otherwise correspond with, those of the previous embodiments will be denoted with the same reference numerals, and descriptions thereof are omitted for brevity.

In the third embodiment described above, both the inner spatial region SR1 and the outer spatial region SR2 are defined by the same physical antenna unit of the antenna 110, and are distinguished from each other by setting different signal strength thresholds (e.g., implemented in software). In contrast, in the present embodiment, the antenna 110 includes different physical antenna units for the inner spatial region SR1 and the outer spatial region SR2.

In particular, in the present embodiment, the antenna 110 includes a first antenna unit (not illustrated) with a particular radiation pattern used to define the inner spatial region SR1, and a second antenna unit (not illustrated) with a different radiation pattern used to define the outer spatial region SR2. In this case, the shapes and sizes of the spatial regions SR1, SR2 may be designed independently of each other, so long as the outer spatial region SR2 is larger than the inner spatial region SR1 so as to surround the inner spatial region SR1.

For instance, one or both of the first antenna unit and the second antenna unit may be designed as a highly directional antenna such that, as explained previously in the second embodiment, the detection of the unmanned vehicle 200 may be simplified for one or both of the inner spatial region SR1 and the outer spatial region SR2.

As a specific example, both the first antenna unit and the second antenna unit may be designed with the same highly directional radiation pattern (e.g., the directional radiation pattern of FIG. 3B), except the second antenna unit is provided with a higher gain than the first antenna unit. As a result, the second antenna unit covers a larger area than the first antenna unit, and therefore the outer spatial region SR2 is larger than the inner spatial region SR1 so as to surround the inner spatial region SR1.

Figure 8:
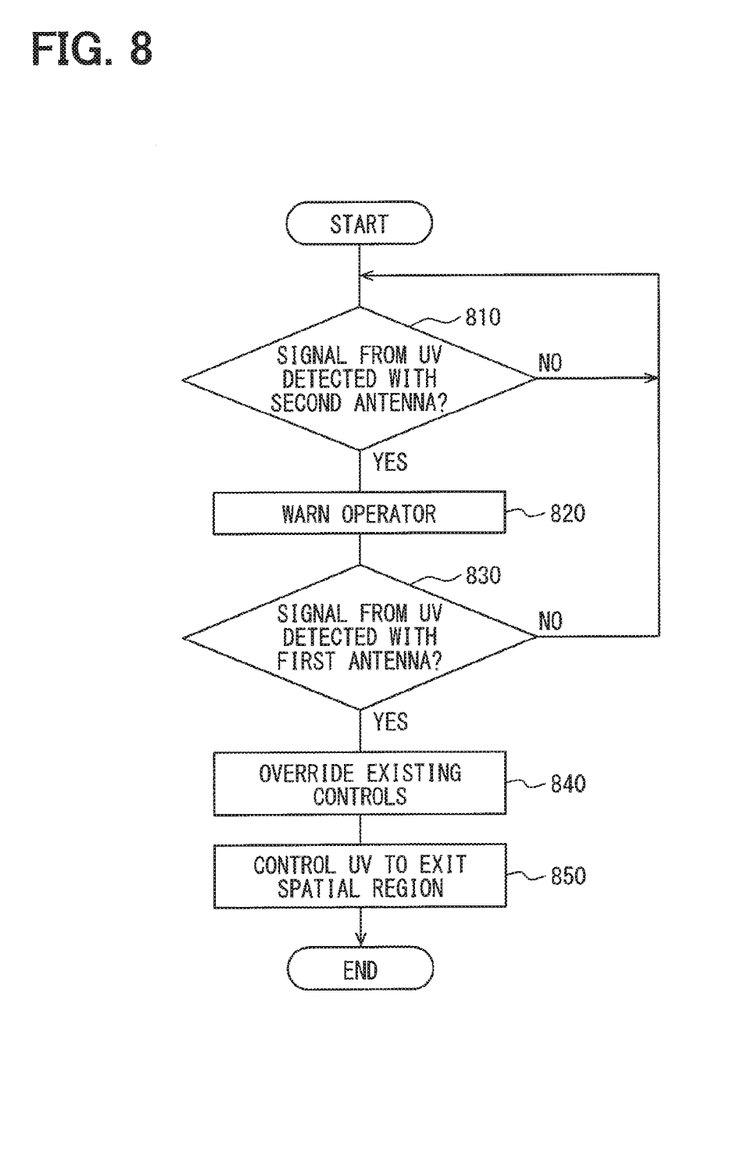
FIG. 8 is a flow chart showing a zone control process.

FIG. 8 illustrates this example as a zone control process. In particular, FIG. 8 largely corresponds to FIG. 7 as previously described, except that both detection steps 810 and 830 are simplified (when compared to the detection steps 710 and 730 of FIG. 7) to a determination as to whether a signal from the unmanned vehicle 200 is detected at all. In particular, as illustrated, the controller 120 warns the operator of the unmanned vehicle 200 if a signal is detected using the second antenna unit (corresponding to the outer spatial region SR2), and the controller 120 overrides the unmanned vehicle 200 to control the unmanned vehicle 200 if a signal is detected using the first antenna unit (corresponding to the inner spatial region SR1). It should be noted that the other steps 820, 840, and 850 are equivalent to steps 720, 740, and 750 of the previous embodiment.

It should be noted that the present embodiment is not limited to the example shown in FIG. 8. Since the shapes and sizes of the spatial regions SR1, SR2 may be designed independently of each other (by independently designing their respective physical antenna units). The present embodiment contemplates a wide variety of modifications in how the inner spatial region SR1 and the outer spatial region SR2 may be implemented, and the specific implementation will depend on the desired application.

Other Embodiments

The present disclosure is described with reference to the above embodiments, but these embodiments are not intended to be limiting. A variety of modifications which do not depart from the gist of the present disclosure are contemplated.

In the above described embodiments, the interface device 100 is configured to detect whether the unmanned vehicle 200 is within a spatial region through, for example, a signal strength from the unmanned vehicle 200. However, in alternative embodiments, this detection process may be simplified by the unmanned vehicle 200 directly broadcasting a set of GPS coordinates indicating the exact location of the unmanned vehicle 200. In this case, the interface device 100 may directly determine the exact location of the unmanned vehicle 200 from the broadcasted GPS coordinates. As a result, for example in the detection step (step 410) of FIG. 4, the controller 120 may simply receive the GPS coordinates from the unmanned vehicle 200 to determine whether the unmanned vehicle 200 is within the spatial region SR1.

The above described embodiments refer to examples where the interface device 100 includes one or two antenna units (each of which may include a plurality of physical antennas). However, the present disclosure is not intended to be limited to one or two antenna units. For instance, in another embodiment, the interface device 100 may be provided with three or more antenna units. These plurality of antenna units may then be designed to correspond to successively larger spatial regions. For instance, the interface device 100 may include three or more spatial regions of different sizes, shapes, or sizes and shapes.

The above described embodiments refer to a third party owner of the unmanned vehicle 200, but this is simply for ease of understanding and is not intended to be limiting. For example, in some cases, the same operator may own both the interface device 100 and the unmanned vehicle 200. In this case, the interface device 100 and the unmanned vehicle 200 are both known in advance, and thus may be implemented together as a drone control system.

The invention claimed is:

1. An unmanned vehicle interface device, comprising:
a wireless transceiver configured with a radiation pattern that covers a particular spatial region; and
a controller coupled to the wireless transceiver, the controller being programmed to:
detect an unmanned vehicle within the particular spatial region using the wireless transceiver,
upon detecting the unmanned vehicle, communicate with the unmanned vehicle using the wireless transceiver to override existing controls of the unmanned vehicle, and
after overriding the existing controls, forcibly control the unmanned vehicle.

2. The unmanned vehicle interface device of claim 1, wherein
the controller is programmed to detect the unmanned vehicle within the particular spatial region by determining that a signal strength from the unmanned vehicle exceeds a predetermined signal strength threshold.

3. The unmanned vehicle interface device of claim 1, wherein
the controller is programmed to detect the unmanned vehicle within the particular spatial region by detecting a signal from the unmanned vehicle.

4. The unmanned vehicle interface device of claim 1, wherein
the controller is programmed to override the existing controls of the unmanned vehicle by sending a predetermined control override message to the unmanned vehicle.

5. The unmanned vehicle interface device of claim 1, wherein the controller is programmed to control the unmanned vehicle to exit the particular spatial region.

6. The unmanned vehicle interface device of claim 1, wherein the controller is programmed to forcibly control the unmanned vehicle by sending a set of GPS coordinates to the unmanned vehicle, the set of GPS coordinates representing a particular location to which the unmanned vehicle is instructed to move toward.

7. The unmanned vehicle interface device of claim 1, wherein
the wireless transceiver includes a first antenna for transmission and a second antenna for reception.

8. The unmanned vehicle interface device of claim 1, wherein
the wireless transceiver includes a dipole antenna.

9. The unmanned vehicle interface device of claim 1, wherein
the wireless transceiver includes a Yagi antenna.

10. The unmanned vehicle interface device of claim 1, wherein
the wireless transceiver includes a compound antenna formed of at least a dipole antenna and a Yagi antenna.

* * * * *